Sept. 20, 1932.  C. F. SHAFFER  1,877,994
SUBAQUEOUS TUNNEL
Filed Oct. 27, 1931   2 Sheets-Sheet 2
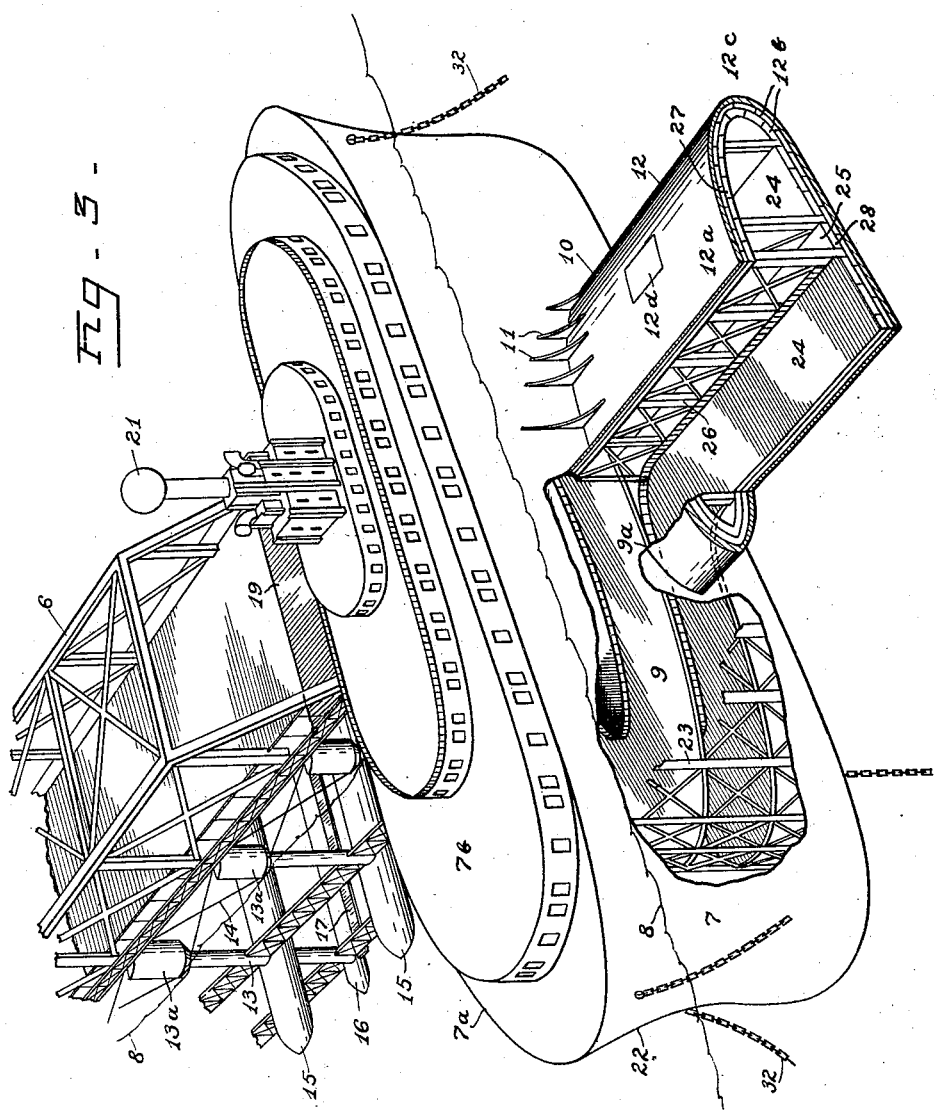
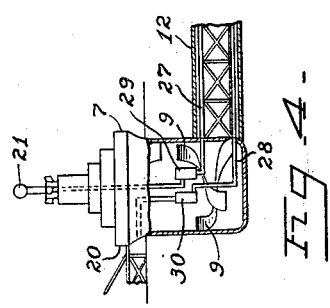
INVENTOR.
CLEVE F. SHAFFER
BY
ATTORNEY

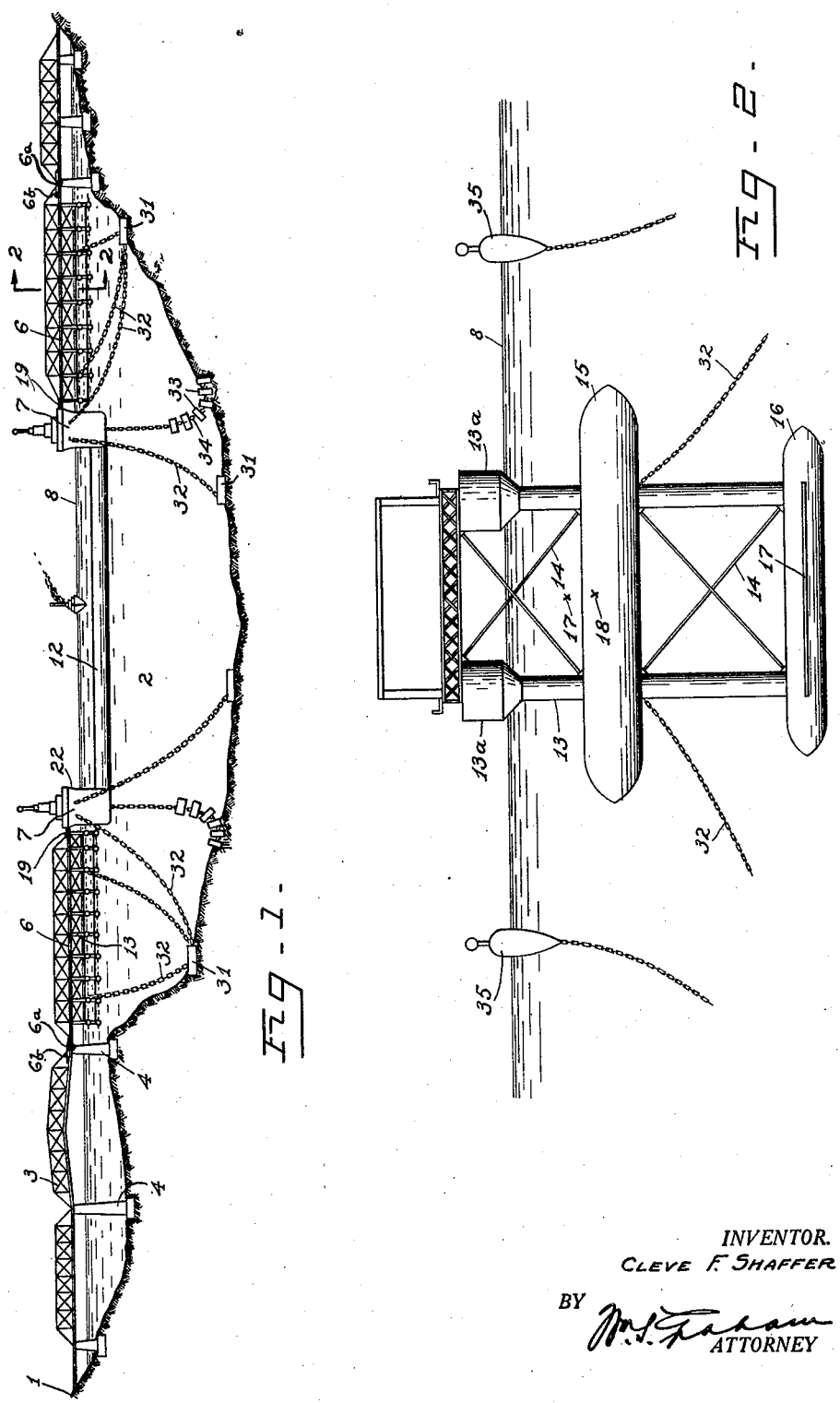

UNITED STATES PATENT OFFICE

CLEVE F. SHAFFER, OF SAN FRANCISCO, CALIFORNIA

SUBAQUEOUS TUNNEL

Application filed October 27, 1931. Serial No. 571,336.

This invention relates to subaqueous tunnels, and particularly to a type of subaqueous tunnel receiving its main support intermediate the surface and bottom of a body of water by its cubic displacement, and having means of ingress and egress communicating with the tunnel below the surface water line. It provides a practical and comparatively inexpensive means for the crossing of hitherto unbridgable bodies of water where great depth and width precludes the usual overhead spans or underwater tunnel or combination thereof, and likewise provides a suitable channel of whatever depth and width required for crosswise shipping; the entire structure being unaffected by wave action and having proper methods for controlling tidal, current and wind action.

The use of bridges over broad expanses of navigable water where marine traffic is congested, and particularly in spanning harbors, presents danger of collision with permanent piers and threatens danger of blocking the harbor in time of war, in case a bomb or explosive shell should hit the structure. For this reason submarine tunnels are a present demand for crossing of wide and deep bodies of water.

Submarine tunnels are well known, and are generally of types having foundations upon the bottom of the body of water, or constitute a bore beneath the normal bottom of the body of water.

In bodies of water which have excessive depth and width, tunnels are impractical to construct and maintain, on account of the tremendous water pressure at great depths, and the expense of excavating bores which are frequently through rock foundation. Both bridges and tunnels having ground support are endangered by earthquakes, whereas a water supported tunnel has a protective water cushion therearound to absorb shock.

Normally, the utilizable depth of a body of water does not exceed forty-five feet except for the operation of submerged submarine boats, and for the type of tunnel illustrated herein there would be no greater difficulty in navigating a submarine boat beneath the tunnel than would be occasioned in navigating beneath the hull of a ship.

This invention seeks to overcome the practical and financial difficulties of both bridges and the usual type of tunnel both of which require long and expensive approaches. Due to water-level construction, this invention may be constructed and maintained at a greatly reduced cost since each foot of structure is supported by buoyancy of water, and no tremendous stresses of great suspended masses are encountered in the design.

Broadly, the invention consists of a tunnel which by its cubic displacement is maintained in suspension intermediate the surface and bottom of a body of water, having a floating approachway by which descending and ascending access may be had to and from the tunnel entrances, and including, where necessary, floating surface approachways or spans, where the submerged floating tunnel section is located a long distance from shore.

One object of the invention is to provide a subaqueous way structure adaptable for use in crossing relatively wide bodies of navigable water where depths are excessive and a relatively wide and deep channel is desired for shipping; another object is to provide a way structure for crossing bodies of navigable water where it is not practicable to employ bridge structures or tunnel structures having foundation support; another object is to provide a subaqueous floating tunnel on which wave action is negligible on account of its inertia and dampening effect to wave movement, and which is not likely to be damaged by earth convulsions or external violent force, such as bombing. Other objects are to provide roadway constructions for descending and ascending from the tunnel entrances; to provide such roadways which float with entrance ends of the tunnel; to provide floating approachways to the ascending and descending ways; to provide anchorage means which optionally provide for movement of the various portions of the structure from tidal, wind or current effect, or may maintain same in permanent placement, and, generally, to improve upon the known type of subaqueous tunnels and approaches thereto.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more clearly comprehend the invention, reference is directed to the accompanying drawings, wherein—

Figure 1 is a schematic longitudinal side view of the structure of the invention.

Fig. 2 is a front elevation of supporting displacement members for an approachway.

Fig. 3 is a perspective of an assembly, partly broken away and partly in section.

Fig. 4 is a schematic end view, partly in section, of a floating unit with a section of tunnel.

Referring to the drawings, wherein like characters of reference designate corresponding parts, 1 represents, generally, the land or shore which borders on a body of water generally indicated 2. A viaduct section 3 having ordinary foundations 4 may furnish a roadway of suitable length across shallow water adjacent the shore for access to either end of the floating portion of the structure, and preferably being of such distance from the water surface to permit small boats and barges to pass thereunder.

A floating bridge span section, generally indicated 6, may adjoin either or both of the sections 3 as a continuation of the roadway over that portion of a body of water which is of sufficient depth to make pillar support and foundations impossible or extremely expensive, but which is not necessary for navigation by large watercraft.

At the terminals of the floating sections 6 is provided a floating unit or buoy 7, which may assume any suitable exterior form, and as exemplified herein is constructed elliptical at the surface water line 8, and is provided interiorly with one or more spiral ramps 9 which furnish an inclined roadway from the elevation of the roadbed of the floating roadway 6 to a point in said floating unit 7 which is below the surface line of the marine body, and preferably allowing traffic up and down in each direction.

The floating unit 7 is provided with an opening 9a below the surface water line 8 to which is connected, by a leak-proof joint 10, as by braces 11, a tubular structure or tunnel generally indicated 12, which is positioned sufficiently beneath the surface water line 8 so that ships of greatest known draft may pass thereover.

At a water depth of forty-five or fifty feet it is known that the density of a body of water is such that surface agitation, due to waves, even in time of storm, has very little effect, and also that the density at that depth makes it undesirable to build commercial vessels of greater draft than approximately forty feet. For these reasons, it is believed that a suitable depth for the uppermost portion 12a of the tubular structure 12 will be sufficient if submerged forty-five feet below the surface water line, but depth of submergence may be altered to meet local conditions.

Referring more in detail to the elements hereinbefore mentioned, the roadbed and superstructure of the floating roadway 6 may be of any accepted well known design and construction, allowing waves to pass through rather than against the structure, and preferably at a proper height above surface water-line to be free of spray from waves. The roadway 6 is connected at one end to the stationary approaches 3 by suitable universal joint hinge 6a with an apron 6b overlying the joint so as to allow for slight pivotal movement either vertically or horizontally, and is supported by vertically disposed pillars 13 which are suitably cross-braced laterally and longitudinally, as at 14, in a usual manner. The pillars 13 are preferably tubular so as to be buoyant by their water displacement and find their sub-support from hollow buoy-like displacement members 15 preferably of elongated or stream-line design, which may be mounted laterally transverse the supporting pillars 13. Beneath the displacement members 15 and preferably substantially parallel therewith are disposed ballast containers 16, which may be supported by the pillars 13, and which are provided longitudinally with laterally extended stabilizing vanes 17. The pillars 13 may also be outwardly flared, as at 13a, at or above the normal surface of water, so as to provide displacement to accommodate any additional live load on sections 6.

The displacement members 15 and ballast containers 16 may, if desired, assume any suitable form, but it is preferred that both the displacement members 15 and ballast containers 16 shall be horizontally disposed with relation to the water line, so that they will be submerged a considerable depth by the weight of the roadway, and not be affected by wave action or other surface agitation. It is also preferred that the floating roadway unit 6 shall be so constructed that the center of buoyancy 17 shall be substantially in vertical alignment and spaced slightly above the center of gravity 18 of the roadway structure 6. This affords a very positively stabilized unit.

The floating units 7 are suitably connected at an end of the floating roadway, as by hinged aprons 19, and are preferably so designed that the entrance and exit 20 to the floating unit 7 is at an upper deck portion 7a on approximately the same level as the roadway of the section 6. Above the upper deck may be any suitable super-structure 7b, as may seem desirable in the circumstances, such as cabins, lounging rooms, automobile parking space, restaurants, etc., topped by a beacon 21. The floating unit 7 is preferably elliptic or streamline on the water line, so as to eliminate resistance to tide, waves or current; and the unit preferably has a longitudinal side abutting the end of the floating roadway. It is preferred that the upper portion of the hull of the floating unit 7 shall flare slightly outwardly and upwardly, as at 22, so as to provide additional displacement above the water line 8 to carry any excessive live load of vehicular or other traffic.

Erected within the floating unit 7 is provided an inclined roadway extending from the level at which the floating roadway 6 connects with the floating unit 7, to the level at which the floating unit 7 communicates with the way level of the tunnel 12, said inclined roadway in the preferred exemplification herein comprising a double spiral ramp 9 which may be suitably supported in any well known manner, as by beams and girders 23; the spiral ramp, in connection with the elliptic interior of the floating unit 7, providing for incline of any practical degree of grade, and preferably from four to ten percent incline.

The tubular body comprising tunnel 12 may be of any suitable cross-sectional shape which affords space for the purposes to which the tunnel is to be devoted, but is preferably of greater lateral transverse than vertical dimension, and as here shown is elliptical in lateral transverse section, that shape being preferred because it affords a streamline section with minimum current drag, and a relatively wide floor space within the tunnel, as well as a broad beam area to facilitate buoyancy and stability, and a broad overhead surface which, by the weight of water thereover serves to stabilize and dampen any possible vertical motion of the floating units 7. The floor of the tunnel is provided with roadways 24 and a pedestrian or emergency lane 25 which communicate with the ramp 9 at the opening 9a. The tunnel 12 preferably has a wall structure composed of hollow watertight units 12b, suitably joined to resist influx of water therebetween and covered with an outer layer of concrete 12c, and can be provided with emergency watertight entrance and exit doors 12d. Internally the tunnel is suitably braced with beams and girders 26, and may have provided within its wall structure ventilation ducts 27, and drainage channels 28, the machinery for operating which may be situated in the unit 7 centrally of the spiral ramp 9, as conventionally indicated 29 for an air pump and 30 for a drainage water pump.

All of the floating sections may have suitable fixed anchorages 31, either above or below water, to solid rock or artificially constructed anchorages, connected by chains or cables 32 which may hold the tunnel and floating units motionless or may have surplus length to provide for rise and fall of tide or other movement of the floating sections and to insure proper alignment of structure as a whole or any part thereof by regulation of slack in cables or chains by windlass actuated automatically or manually, in a well known manner. The floating units 7 can also be provided with balancing ballast depending therefrom, comprising a series of weight segments 33 connected by flexible means, such as chains 34, which also serve to automatically compensate for differential of live load by increasing or decreasing the number of suspended weights 33.

Necessary protection by any suitable means may be afforded against collision with the entire structure or any portion thereof by means, generally indicated 35, which may consist of lights, sound-buoys, floating chain barriers, submerged nets, and the like, but these are not shown in detail in the drawings, since they are well known expedients.

With the structure thus outlined, the floating portions may in case of emergency, or needed repair, be towed to shallow water; such as in time of war, may be towed by tugs to places of safety and temporarily approaches constructed to connect therewith. It will also be observed that the hazard from aerial bombs or submarine torpedoes is greatly reduced, by reason of the tunnel and the supports of approachways being formed of individual buoyant units, so that damage to one or several will not affect the others.

It is apparent that the structure described and exemplified in the drawings may be modified according to the particular body of water to be crossed and local conditions to be met, and that one or both floating roadway sections might be eliminated, or other forms of descending and ascending approach provided for entrance to or exit from the tunnel section, the crux of the invention residing in a submerged floating tunnel with any suitable means of approach which excludes influx of water into the tunnel.

I claim:—

1. A subaqueous tunnel comprising a tubular body submerged intermediate the surface and bottom of a body of water and providing a way, said tubular body having an opening at each end, a buoyant unit having an entrance at a level above the surface water line and an opening in communication with the interior of the tubular body, and a spirally inclined way intermediate said entrance level and the level of the way in the submerged tubular body.

2. A subaqueous tunnel structure comprising a tubular body adapted for buoyancy by its water displacement, a floating approachway thereto having a way above the surface water level, and a floating unit interposed between the floating approachway and the tubular body, said floating unit having an entrance in communication above the water surface with the floating approachway and having an opening in communication below the water surface with the interior of the tubular body.

3. A subaqueous tunnel structure comprising a tubular body adapted for buoyancy by its water displacement, a floating approachway thereto having a way above the surface water level, and a floating unit interposed between the floating approachway and the tubular body, said floating unit having an entrance in communication above the water surface with the floating approachway and having an opening in communication below the water surface with the interior of the tubular body, and an inclined way interposed between said entrance and said opening in said floating unit.

4. A subaqueous tunnel structure comprising a tubular body elliptical in lateral transverse cross section, adapted for buoyancy by its water displacement, a floating approachway thereto having a way above the surface water level, and a floating unit interposed between the floating approachway and the tubular body, said floating unit having an entrance in communication above the water surface with the floating approachway and having an opening in communication below the water surface with the interior of the tubular body.

5. A subaqueous tunnel structure having a tubular body characterized by buoyancy and adapted for submergence intermediate the surface and bottom of a body of water, an approach section provided with a superstructure including a way above the surface of the water and having horizontally disposed elongated buoyant members beneath the water surface, vertical members connecting the buoyant members and the superstructure, and inclined way means intermediate the way of the approach section and the interior of the tubular body.

6. A subaqeous tunnel structure having a tubular structure having a tubular body characterized by buoyancy and adapted for submergence intermediate the surface and bottom of a body of water, an approach section provided with a superstructure including a way above the surface of the water and having horizontally transversely disposed elongated buoyant members beneath the water surface and horizontally transversely disposed ballast members below the buoyant members, and vertical members connecting the ballast members and buoyant members to the superstructure, and inclined way means intermediate the way of the approach section and the interior of the tubular body.

7. A floatable unit for spanning a body of water above the surface thereof and adapted for approaching a submerged tunnel having an outlet above the surface of the water, comprising a superstructure providing a way above the surface of the water, vertically disposed support members depending from the superstructure, a plurality of elongated tubular members mounted horizontally in spaced relation on the support members and laterally transverse of the superstructure.

8. A floatable unit for spanning a body of water above the surface thereof and adapted for approaching a submerged tunnel having an outlet above the surface of the water, comprising a superstructure providing a way above the surface of the water, vertically disposed support members depending from the superstructure, a plurality of elongated buoyant members mounted horizontally in spaced relation on the support members, and a plurality of elongated ballast members mounted horizontally in spaced relation on the support members below the buoyant members, said buoyant members and ballast members being disposed laterally transverse of the superstructure.

9. A floatable unit for spanning a body of water above the surface thereof and adapted for approaching a submerged tunnel having an outlet above the surface of the water, comprising a superstructure providing a way above the surface of the water, vertically disposed support members depending from the superstructure, a plurality of elongated buoyant members mounted horizontally in spaced relation on the support members, and a plurality of elongated ballast members mounted horizontally in spaced relation on the support members below the buoyant members, said buoyant members and ballast members being disposed laterally transverse of the superstructure, said ballast members having longitudinal vanes extending laterally therefrom.

10. A subaqueous tunnel comprising a buoyant tubular body submerged intermediate the surface and bottom of a body of water and providing a way, a floating unit providing an above-water approachway to said tubular body, and an inclined way extending from the above-water approachway to the way in the tubular body.

11. A subaqueous tunnel comprising a buoyant tubular body submerged intermediate the surface and bottom of a body of water and providing a way, a floating unit providing an above-water approachway to said tubular body, an inclined way extending from the above-water approachway to the way in the tubular body, and an apron overlying the connection between the approachway and the inclined way.

12. In combination with a subaqueous tunnel adapted for submergence intermediate the surface and bottom of a body of water, and a floating approachway having a way above the surface water level, of a floating unit interposed between said approachway and tunnel, said unit providing a way for connecting said tunnel with said approachway.

13. In combination with a subaqueous tunnel adapted for submergence intermediate the surface and bottom of a body of water, and a floating approachway having a way above the surface water level, of a floating unit interposed between said approachway and tunnel, said unit providing an inclined way for connecting said tunnel with said approachway.

14. A tunnel structure comprising a pair of floating units spaced apart, each providing an entrance in communication both above and below the water surface, and a tubular body adapted for submergence intermediate the surface and bottom of a body of water and having its ends connected to said floating units, each of said ends adapted to register and cooperate with corresponding entrances in said floating units below the water surface.

15. A tunnel structure in accordance with claim 14, wherein each of said floating units is provided with a floating approachway, said approachways adapted to register and cooperate with corresponding entrances in said floating units above the water surface.

In testimony whereof, I have affixed my signature.

CLEVE F. SHAFFER.